United States Patent [19]

Parken et al.

[11] Patent Number: 5,523,899

[45] Date of Patent: Jun. 4, 1996

[54] METHOD AND APPARATUS FOR THERMAL CALIBRATION OF HARD DISK DRIVE

[75] Inventors: Alec Parken, Thousand Oaks, Calif.; Robert Hamilton, deceased, late of Maquoketa, Iowa, by Janice Hamilton, legal representative, Kevin J. Hamilton, heir, Andrew R. Hamilton, heir

[73] Assignee: Micropolis Corporation, Chatsworth, Calif.

[21] Appl. No.: 540,570

[22] Filed: Oct. 6, 1995

Related U.S. Application Data

[63] Continuation of Ser. No. 219,199, Mar. 29, 1994, abandoned, which is a continuation of Ser. No. 797,467, Nov. 22, 1991, abandoned.

[51] Int. Cl.$^6$ ........................................ G11B 5/596
[52] U.S. Cl. ........................... 360/77.04; 360/77.05
[58] Field of Search ............................ 360/75, 77.01, 360/77.04, 77.05, 77.06, 77.07, 77.11, 78.07, 135, 77.08; 369/44.32, 44.26, 275.3

[56] References Cited

U.S. PATENT DOCUMENTS

| | | | |
|---|---|---|---|
| 4,205,338 | 5/1980 | Schaefer | 360/77.06 |
| 4,454,549 | 6/1984 | Pennington | 360/77.08 |
| 4,633,345 | 12/1986 | Keener | 360/77.07 |
| 4,745,497 | 5/1988 | Ozawa | 360/77.07 |
| 4,789,909 | 12/1988 | Moteki | 360/77.06 |
| 4,967,292 | 10/1990 | Moteki | 360/75 |
| 5,005,089 | 4/1991 | Thanos et al. | 360/77.05 |
| 5,040,084 | 8/1991 | Liu | 360/77.04 |

*Primary Examiner*—Georgia Y. Epps
*Assistant Examiner*—P. W. Huber
*Attorney, Agent, or Firm*—Poms, Smith, Lande & Rose

[57] ABSTRACT

A method and apparatus for optimizing positional data for use in connection with a hard disk type magnetic memory storage device. The apparatus includes a pattern encoded on a dedicated track of the hard disk including first and second set of signals repetitively encoded in a series of cells. The method includes the steps of periodically accessing the dedicated track with the read/write head and calculating amplitude and phase information for a trigonometric instantaneous correction function. Amplitude and phase information are subsequently stored and the positional signal for the read/write head is continually modified by a most recent determination of the correction function. The apparatus of the present invention includes circuitry for distinguishing between sub-elements of the repetitive pattern on the hard disk.

17 Claims, 5 Drawing Sheets

METHOD AND APPARATUS FOR THERMAL CALIBRATION OF HARD DISK DRIVE

This application is a continuation of application Ser. No. 008/219,199 filed Mar. 29, 1994, now abandoned, which was itself a continuation of Ser. No. 07/797,467, filed Nov. 22, 1991, now abandoned.

FIELD OF THE INVENTION

The present invention relates generally to apparatus and methods for computer data storage systems and, more particularly, to correction of data track positional signals in a hard disk drive type data storage systems.

BACKGROUND OF THE INVENTION

Figure 1:
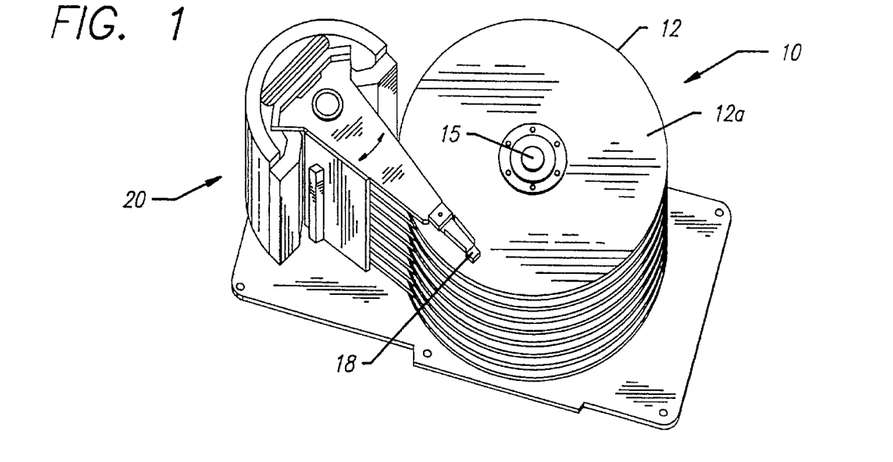
FIG. 1 is a perspective view of a hard disk memory storage system.

Hard disk type magnetic memories have become one of the more commonly used systems for the storage of large quantities of data in computers. Up to 1.6 gigabits of data have been stored on a single disk about 6 inches in diameter. Hard disk memories usually include a rigid disk having a magnetic recording material applied to either or both of the flat surfaces of the disk. Small read/write heads are disposed adjacent these coated surfaces to access data on the disk. Typically, the read/write heads can either impress a magnetic field onto a segment of the disk as data is "written" onto the disk or sense the polarization of an existing magnetic field on the disk as data is "read" from the disk. A generally conventional hard disk type data storage system is illustrated in FIG. 1. The hard disk system 10 includes a plurality of rigid disks 12 attached at their centers to a spindle 15 with a series of read/write heads 18 flexibly coupled to a servo system 20 disposed adjacent the hard disks 12. Usually one read/write head 18 is associated with each flat surface 12a of the hard disks. In operation the disks 12 commonly rotate at speeds of several thousand revolutions per minute with the read/write heads 18 floating above the surfaces of the disks on a boundary layer of air about a millionth of an inch thick. Pivotal motion of the servo system 20 alters the position of the read/write heads 18 relative to the center of the disks 12, affording the read/write heads 18 coverage of the flat surfaces of the spinning disks 12.

The data recording surfaces of the hard disk are normally divided into numerous circular regions called tracks which are in turn subdivided into sectors. A sector normally takes up a predetermined portion of the arc of a single circular track. Typically, one surface on one of the hard disks 12 has a pre-recorded pattern dedicated to providing positional information for the heads 18. This dedicated hard disk surface is commonly referred to as the servo surface. Since the heads 18 move in unison, the positional information stored on the dedicated servo surface may be used to position any of the heads 18 with respect to any desired data track on their associated hard disk data surface. As data storage densities on hard disks continues to increase, however, the width of each track on the hard disk continues to decrease. Such tracks are now on the order of half a thousandth of an inch wide. The trend towards increasingly narrower track widths and increased data densities, however, has led to erroneous positioning of the read/write heads 18 when, for example, the dimensions of the hard disks 12 or the pivot arms for each of the read/write heads 18 changes even minutely due, for example, to thermal expansion. Errors in positioning the read/write head can then result, causing data errors and data recovery delay as the actual position of the track is sought.

Previous efforts have been attempted to correct for erroneous track location signals in hard disk control systems. U.S. Pat. No. 4,454,549 to Pennington, for example concerns a system for the calculation of track position displacement that relies on signals encoded on the disk to indicate the start of a sector. Two groups of "start of sector" signals are imprinted side by side along a circumferential arc oriented at an angle to the circumferential arc of the data portion of the sector. Measurement of a preponderance of either signal group is then employed to calculate a track position correction signal. This approach, however, by necessitating the encoding of start of sector signals onto each sector of a data track, disadvantageously reduces the amount of space within each track available for the storage of actual magnetic memory data. Imprinting start of sector signals on the hard disk also renders the Pennington approach susceptible to defects in the magnetic recording media of the hard disk. Media defects can either mask a true start of sector signal or, alternatively, masquerade as a false start of sector signal. Either condition may exacerbate problems in properly locating a desired sector or track and thus slow or otherwise hamper retrieval of data stored in memory. Thus, there still exists a need for an efficient track displacement sensing system that does not require encoding start of sector signals on hard disk data tracks but which can be implemented both efficiently and economically. The present invention fulfills this need.

SUMMARY OF THE INVENTION

In accordance with the present invention a unique signal pattern is encoded onto a dedicated track located on each memory storage layer of a hard disk. This pattern includes a first and second set of signals repetitively encoded in a series of cells that occupy the entire circumference of the dedicated track. A centerline of the dual signal pattern within each cell is offset from a center line of the dedicated track by an amount which varies for each cell within any particular sector. This format is subsequently repeated in each sector of the dedicated track. In the preferred embodiment, the offsets of the dual signal pattern within each cell are a multiple of the radial displacement of the read/write head with respect to the hard disk that is associated with a single pivotal step of the servo system.

In operation, displacement of the read/write head from the actual center line of the dedicated track results in a difference in the number of signals read from each of the first and second signal sets within any particular sector. Unique firmware is provided to measure this signal count difference. A microprocessor dedicated to disk drive control then calculates several parameters for correction of track positional signals that are independent of the angular orientation of the hard disk. Additional firmware is also provided to store the angularly independent parameters and combine them with a signal representative of the instantaneous angular position of the disk in order to generate a track position correction signal that continuously changes as the angular position of the disk changes.

Another novel feature of the present invention concerns a repetitive measurement of the first and second signal counts from the dedicated calibration track, and recalculation of the angularly independent track correction parameters to effect a "null seeking" track position correction signal. Previously calculated track correction signals are employed in the subsequent measurement of the calibration pattern count difference and recalculation of the angularly independent track correction parameters. The new values for the angularly independent correction parameters are then cumulatively added to the prior parameter values to generate subsequent track position signals correction. This repetitive measurement and cumulative addition of correction parameters effectively reduces any errors potentially introduced by the measurement and calculation of the track position correction signals.

Numerous other objects, features and advantages of the present invention will become more apparent from a consideration of the following detailed description, along with the accompanying drawings, wherein like numbers designate like elements.

DETAILED DESCRIPTION OF THE INVENTION

Figure 2:
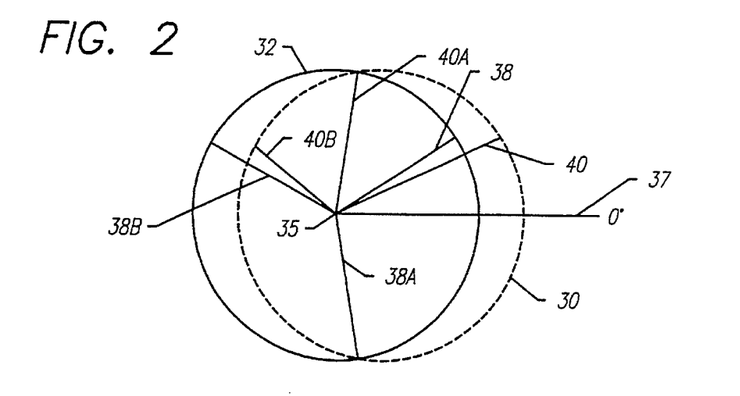
FIG. 2 is a schematic view of a data track on a hard disk compared to the theoretical position of the track.

Referring to the figures, and more particularly FIG. 2, there is shown diagrammatically a comparison of an estimated path 30 and actual path 32 of a typical data track on a hard disk in relation to an axis of rotation 35. The estimated path 30 would correspond to track position data stored in the disk drive control system. As shown in FIG. 2, discrepancies between the estimated path 30 and actual path 32 vary as the function of angular position along the data track. Thus with respect to an arbitrary index 37 signifying a zero degree orientation of the disk, the radial distance 38 of the actual track path 32 from the rotational axis 35 may be less than radial distance 40 of the estimated path 30, equal to the radial distance of the estimated path 30 (as shown at 38A and 40A in FIG. 2) or greater than the radial distance of the estimated path 30 (as shown at 38B and 40B in FIG. 2). Accordingly, track location correction signals applied to accurately position a read/write head over the data track should take into account the angular orientation of the disk.

In accordance with the present invention a uniquely configured track is provided on each data recording surface of the hard disk that is dedicated specifically to positional calibration. Periodic reading of this calibration track is performed in order to compute track position correction parameters that are independent of the angular position of the hard disk. As discussed more fully below these parameters are then stored and subsequently combined with a signal representative of the angular position of the disk to subsequently provide a continuously varying track positional correction signal that is applied to positional control signals being sent to the servo control system. In the preferred embodiment the track position correction parameters are periodically refined by later scans of the dedicated calibration track. During these subsequent calibration track scans the previously derived positional correction parameters are employed to properly locate the dedicated calibration track. The subsequently derived positional correction parameters are then cumulatively added to the previously derived parameters to effect a "null sensing" approach to an optimized set of correction parameters.

Figure 3:
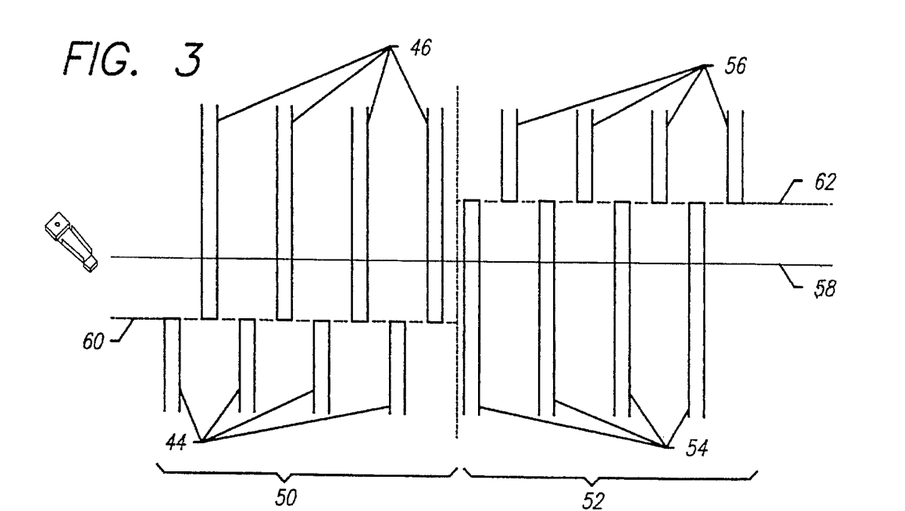
FIG. 3 is a simplified fragmentary view of the track position correction pattern encoded on a dedicated calibration track in accordance with the present invention.

Referring to FIG. 3, there is shown in simplified form a portion of the novel track position correction pattern of the present invention. In the preferred embodiment this pattern includes repetitive groups of "A pulses" encoded onto the magnetic recording surface of the hard disk opposite and in between repetitive groups of "B pulses". These repetitive groups of A and B pulses are organized into subsets of four A pulses and four B pulses each that are referred to as cells. Each sector of the dedicated calibration track includes a plurality of such cells.

In FIG. 3 two adjacent cells 50 and 52 are shown, the former cell 50 including four A pulses 44 and four B pulses 46 and the latter cell 52 including four A pulses 54 and four D pulses 56. A centerline between the A and B pulses within each cell is also offset from a center line 58 of the dedicated calibration track. Each cell has a different offset from the track center line 58. As shown in FIG. 3, a center line 60 between the A pulses 44 and opposing B pulses 46 of cell 50 is offset from the track center line 58. Similarly, a center line 62 between the A pulses 54 and B pulses 56 of cell 52 is offset from the track center line 58. In the preferred embodiment, the magnitude of the offset for each cell is a whole number multiple of the minimum distance associated with a single positioning step of the read/write heads across the hard disk. If, for example, the read/write head may be displaced a minimum of 4 microinches across the surface of a hard disk each time the read/write head is stepped by its servo control system, the offset distance between the center line of each cell and the center line of the dedicated calibration track would preferably be a multiple of this four micro inches.

The offset spacings of the cells within each sector of the calibration are organized in ascending order, from a maximum offset to one side of the calibration track center line at the start of each sector through a minimum offset spacing near the middle of the sector and onto a maximum offset on the other side of the calibration track center line at the end of each sector. In the preferred embodiment, forty-two cells occupy each sector of the dedicated calibration track. Thus twenty-one cells in each sector of the calibration track have center lines located to one side of the calibration track center line and another twenty-one cells in each sector have center lines to the other side of the calibration track center line. None of the cells, however, need necessarily have a center line coincident with the calibration track center line.

Figure 9:
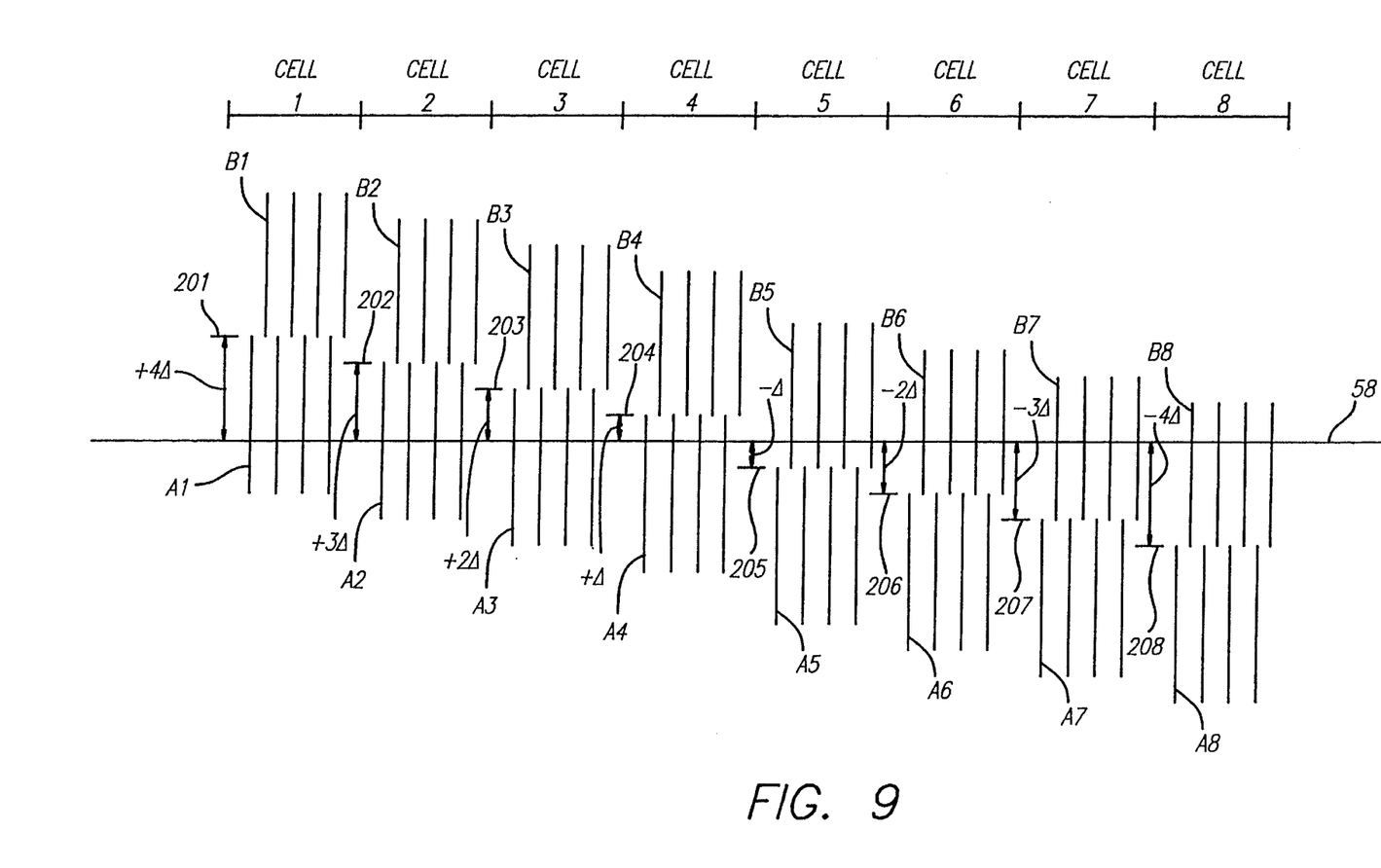
FIG. 9 is a simplified view illustrating sets of calibration indicia having centerlines that are offset from a centerline of the data track by different distances.

A simplified arrangement illustrating eight cells, designated as CELL 1 to CELL 8 is illustrated in FIG. 9. The cells CELL 1 to CELL 8 include A pulses A1 to A8 and B pulses B1 to B8 that are spaced on opposite sides of centerlines 201 to 208 respectively.

As described above, the centerlines 201 to 208 are arranged in order, from a maximum offset of +4Δ above the track center line 58 for CELL 1, through a minimum offset of +Δ above the center line 58 for CELL 4, to a maximum offset −4Δ below the center line 58 for CELL 8. The parameter Δ is the incremental offset distance, with each centerline 201 to 208 being offset by multiple of Δ from the center line 58.

In operation, an equal number of A and B pulses are read by the read/write head as it traverses a sector of the dedicated calibration track. Erroneous positioning of the read/write head with respect to the calibration track, however, causes the read/write head to follow a path that is not coincident with the calibration track center line, resulting in a difference in the number of A and B pulses counted within all the cells of the sector. Referring to FIG. 3, if the read/write head were erroneously positioned several servo step away from the calibration track center line 58, thus following a path coincident with the center line 62 of cell 52, the read/write head would read the same number of A and B pulses in cell 52 but would entirely miss reading the A pulses of cell 50, while still reading the B pulses in that cell. Thus, across the entire sector within which cells 50 and 52 reside, the difference in the number of A pulses and B pulses sensed by the read/write head would be eight pulses. Similarly, if the read/write head were erroneously positioned so as to follow a path two servo steps away from the track center line 58, the A pulses 44 of cell 50 as well as the A pulses 54 of cell 52 would be missed by the read/write head, although the B pulses in both cells would still be sensed by the head. Thus a displacement of the read/write head with respect to the calibration track center line equivalent in magnitude to two servo steps would yield a difference in the number of A pulses and B pulses across the entire sector of sixteen. In this fashion, the magnitude of the difference in A pulses and B pulses sensed by each sector of the dedicated calibration track provides an indication of the positional error of the read/write head with respect to the center line path of the dedicated calibration track for each separate sector of the calibration track. As discussed more fully below, this information is then used to calculate positional correction signals for the read/write heads.

Figure 4:
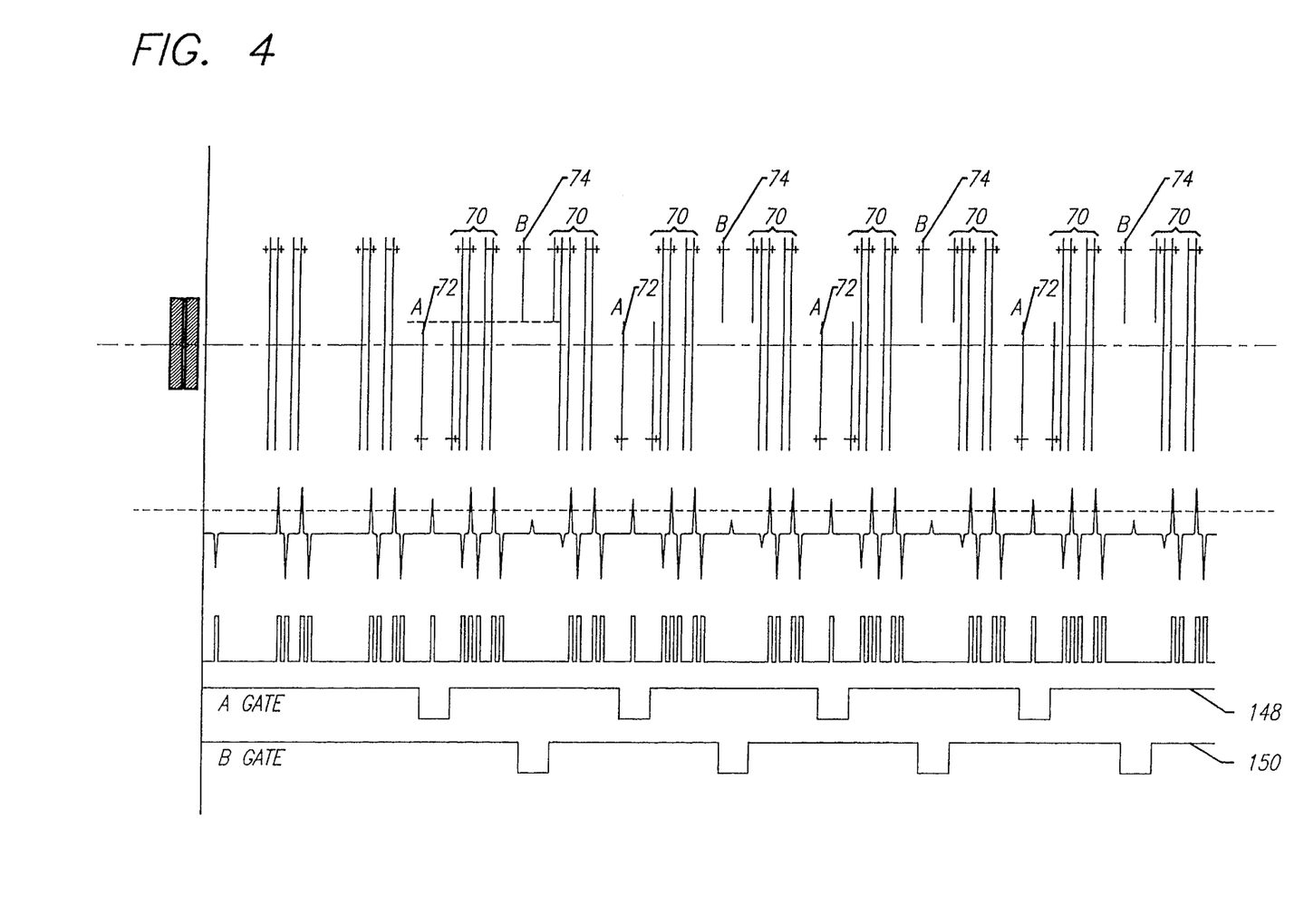
FIG. 4 is an illustrative view of a calibration track in accordance with a preferred embodiment of the present invention.

FIG. 4 illustrates a preferred embodiment of the actual magnetic pattern encoded within one cell of the dedicated calibration track in accordance with the present invention. As shown, additional magnetic signals 70 are encoded between the A pulses 72 and B pulses 74 of the cell. These additional signals are provided to accommodate the requirements of automatic gain control circuits that are typically employed in disk drive control systems to compensate for variations in the strength of read signals from the read/write heads, but which do not form a part of the present invention. Such circuits typically adjust the gain of a preamplifier that is coupled to the read/write head in such a manner that the preamplified output signal from the read/write head remains generally constant. The additional magnetic signals 70 disposed within the calibration track cells are included to avoid undesirably excessive amplification of the electrical signals from the read/write head while maintaining a desired spacing and organization of the A pulse and B pulse in the cell patterns within each sector of the calibration track.

Figure 5:
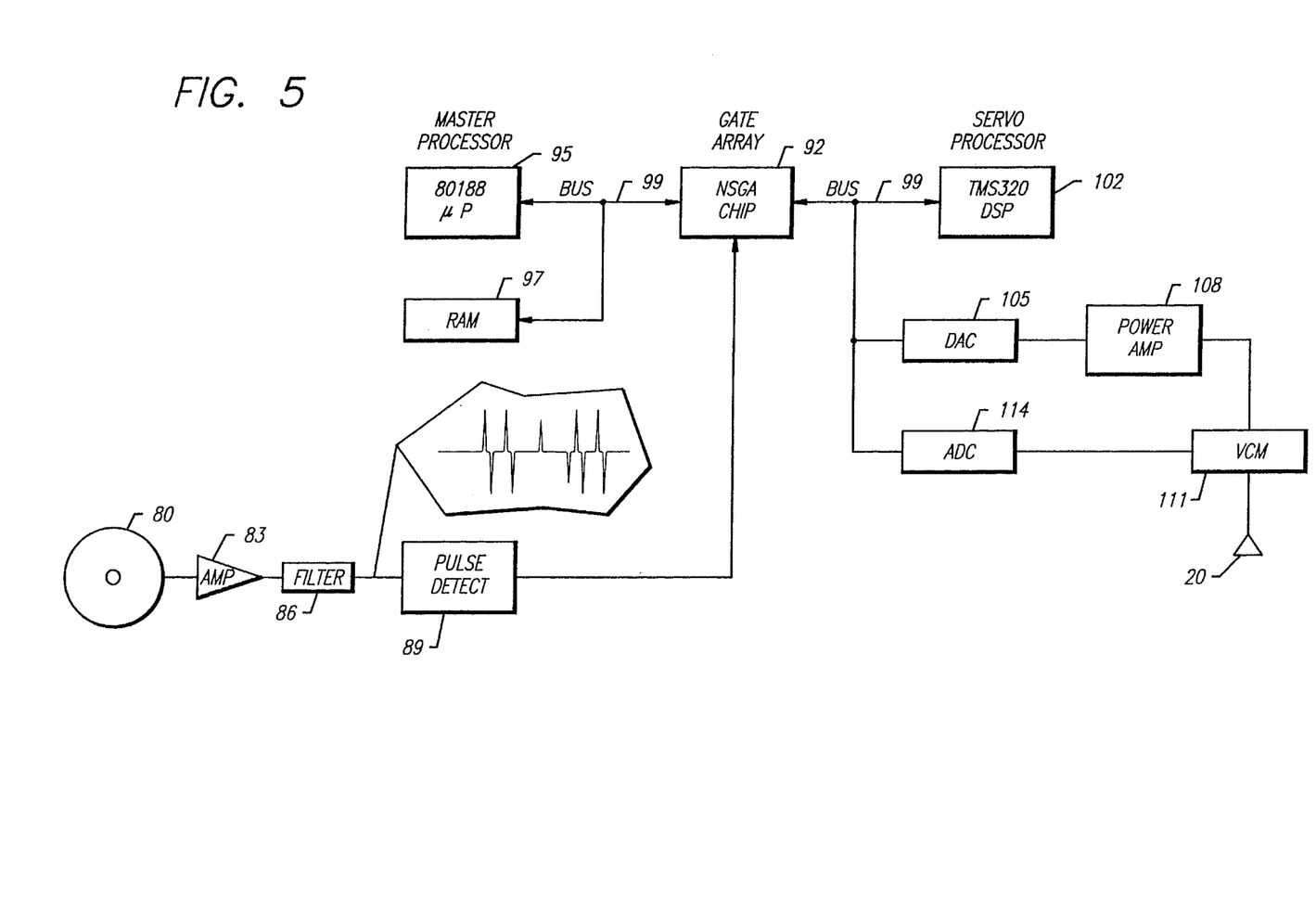
FIG. 5 is a schematic view of an output signal resulting from discrepancies in the theoretical position of the calibration track as a function of angular position.

Referring to FIG. 5 there is shown a novel circuit suitable for calculating a track position correction signal in accordance with the present invention. As illustrated, signals received from the read/write heads associated with the hard disk system 80 are coupled to a pre-emp 83, filter 86 and pulse detector 89 to provide a digitized signal to a gate array chip 92. This chip 92 performs the function of counting both the number of A and B pulses sensed by the read/write head while it is positioned over the dedicated calibration track, and further provides data indicating the angular orientation of the disk with respect to an arbitrary zero degree index setting.

Calculation of the angular orientation of the disk 80 without use of "start of sector" signals encoded on to the surface of the disk is performed in accordance with the subject matter disclosed in a co-pending patent application entitled Sector Pulse Generator For Hard Disk Drive Assembly that has also been assigned to the assignee of the present application, Micropolis Corporation. The gate array chip 92 also includes the circuitry disclosed in this patent application. The contents of this co-pending application are incorporated into this detailed description by this reference. The circuitry and processes incorporated in the gate array chip 92 to count the number of A and B pulses sensed by the read/write head as it passes over each sector of the dedicated calibration track is discussed more fully below.

Track correction parameters that are independent of the angular orientation of the disk are determined by a dedicated microprocessor 95 and an associated random access memory 97. The microprocessor 95 is coupled to the gate array chip 92 by an appropriate data bus 99. The microprocessor 95 is further coupled to a servo processor control chip 102 via the NSGA 92. In the preferred embodiment the servo control chip 102 stores the angular orientation independent control parameters calculated by the microprocessor 95 and combines these parameters with disk angular orientation signals from the gate array chip 92 to calculate a track position correction signal that varies with the angular orientation of the disk. The servo control chip 102 is also responsible for controlling the position of the read/write head with respect to the disk 80. This control is accomplished through a control loop coupled to the servo control chip 102 through the bus 99. The control loop includes a digital to analogue convertor 105 coupled to a power amplifier 108 for providing amplified analogue signals corresponding to the digital output control signals of the servo control chip 102. The analogue output of the digital to analogue convertor 105 is coupled to the servo unit 20 at the read/write head, also shown in FIG. 1. An output voltage from the servo unit 20 is also coupled to an analogue to digital convertor 114 which is in turn accessed by the servo control chip 102 through the bus 99.

In operation, track position calibration is performed on a periodic basis by positioning the read/write head over the dedicated calibration track on the hard disk and reading the number of A and B pulses encountered by the read/write head within each sector. The gate array chip 92 latches the number of A and B pulses received within a given zone and passes these totals to the microprocessor 95. The microprocessor 95 then reads the totals of A and B pulses latched and calculates several positional control parameters that are independent of the angular orientation of the disk. While information identifying the specific zone from which the A and B pulses were received is not provided by the gate array chip 92, the zone associated with an initial index position is identified, allowing for proper ordering of the remaining A and B pulse sums. The microprocessor 95 subsequently stores the positional control parameters in the servo control chip 102 for subsequent application. During normal disk memory data scans, after the calibration process is completed for each read/write head and associated hard disk data surface, the servo control chip 102 continuously calculates and adds a track position correction offset signal in order to optimize placement of the read/write head with respect to a desired data track.

Figure 6:
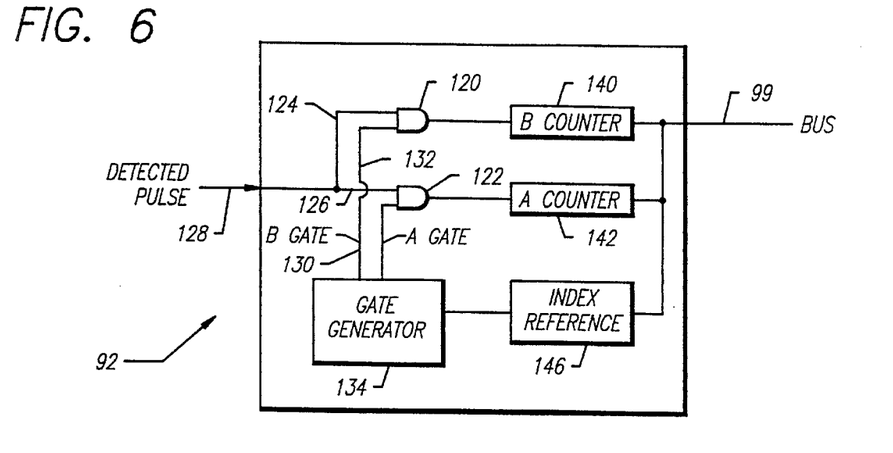
FIG. 6 is a block diagram of a circuit employed in connection with the present invention to synchronize signals from the correction pattern encoded on the calibration track.

Referring to FIG. 6 there is shown circuitry within the gate array chip 92 associated with counting the number of A and B pulses within each sector of the dedicated calibration track. The digital input to the gate array chip 92 does not normally distinguish between signals representative of the A pulses, B pulses, or any other signal pulses that encoded within the dedicated calibration track of the hard disk. The chip 92 is therefore advantageously provided with means for distinguishing between the various magnetic signals sensed by the read/write head as it scans the calibration track. As shown in FIG. 6, the gate array chip 92 includes a pair of AND gates 120, 122 both having an input lead 124, 126 respectively coupled to the digital input line 128 of the chip 92. The second input leads 130, 132 of each AND gate 120 and 122 are both coupled to a gate generating circuit 134. The outputs 136, 138 of the AND gates 120, 122 are in turn coupled to two counters 140 and 142. These counters are in turn coupled to the data bus 99 and are therefore in communication with the dedicated disk drive microprocessor 95, as illustrated in FIG. 5. As discussed above, the circuitry and firmware 146 associated with the calculation of the instantaneous angular orientation of the hard disk is disclosed in a co-pending patent application assigned to the present assignee. The output from this index reference circuit 146 is provided to both the data bus 99 and the gate generator 134.

In operation, the gate generator 134 generates enabling signals to the two AND gates 120, 122 only during those intervals of time when the orientation of the disk is such that either A pulses or B pulses respectively would be sensed by the read/write head. Timing synchronization for these enabling signals are derived from servo patterns encoded on the dedicated servo surface on one of the hard disk surfaces. The timing relationship between the A gate and B gate output signals from the gate generator 134 and the sensing of the magnetic signal pulses by the read/write head, including the desired A pulses and B pulses, is further illustrated in FIG. 5. As shown, the A gate signal output 148 and B gate signal output 150 are output from the gate generator 134 only during those brief time intervals when either an A pulse or a B pulse would be respectively sensed by the read/write head. Since the AND gates 140 and 142 generate output signals only when both input leads are energized, the outputs of the AND gates 140 and 142 respectively generate signals, cumulatively stored in counters 140 and 142, representative of the total number of A pulses and B pulses sensed by the read/write head within a particular sector of the dedicated calibration track. These totals are in turn accessed by the dedicated disk drive microprocessor 95 to calculate positional correction parameters for subsequent positioning of the read/write head.

Figure 7:
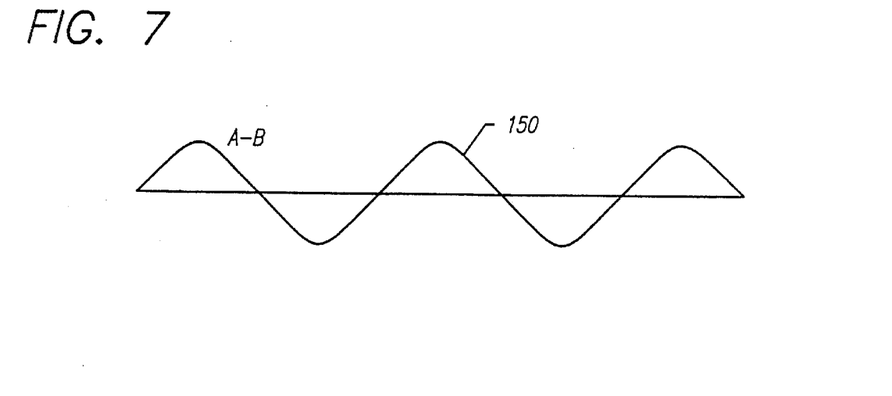
FIG. 7 is a schematic diagram of a control circuit for applying a positional correction signal to the track position signal applied to a read/write head to data tracks on a hard disk drive.

The difference of A and B counts from the counters 120 and 122 of gate array chip 92 varies with the angular orientation of a hard disk in a curve that approximates a trigonometric sine-cosine curve 150, as illustrated in FIG. 7. In the presently preferred embodiment, servo step correction signals for properly positioning the read/write head with respect to the center line of the dedicated calibration track are determined by approximating the curve illustrated in FIG. 7 within the microprocessor 95 by the equation:

$$TCAL = DC + M_1 SIN(APC) + M_2 COS(APC) \quad (1)$$

where TCAL is the magnitude of the displacement of the read/write head from the center line of the dedicated calibration track, and where DC, $M_1$ and $M_2$ are all constants with respect to the angular position count of the disk (APC). These constants are in turn obtained from the following equations:

$$DC = \frac{1}{S \cdot \Delta} \sum_{i=0}^{S-1} x(i) \quad (2)$$

where x(i)=the difference in the counts of A and B pulses for the "i"th sector;

S=the number of zones in each track of the hard disk;

$\Delta$= the A–B difference value obtained when the read/write head is displaced one servo step from the centerline of the dedicated calibration track.

As discussed above the offset of the centerline for the A and B pulses in each cell from the centerline of the calibration track is advantageously selected as a whole number of the minimum distance traversed by the read/write head in a single servo step. Similarly, in the preferred embodiment four A pulses and four B pulses are provided in each cell. Thus in the preferred embodiment each displacement of the read/write head from the calibration track centerline equal to a single servo step of the read/write head yields an A–B pulse count difference of eight. Consequently, in the preferred embodiment $\Delta$=8. Additionally, 31 sectors are provided in the head disk calibration track. Accordingly in the preferred embodiment equation (2) may be rewritten as $$DC = \frac{1}{248} \sum_{i=0}^{30} x(i) \quad (3)$$

The angular independent constants $M_1$ and $M_2$ are similarly provided by the equations $$M_2 = \frac{2}{S \cdot \Delta} \sum_{i=0}^{S-1} x(i) \cos\left(\frac{2\pi i}{S}\right) \quad (4)$$

and $$M_1 = \frac{2}{S \cdot \Delta} \sum_{i=0}^{S-1} x(i) \sin\left(\frac{2\pi i}{S}\right) \quad (5)$$

Conventional microprocessors satisfactory for use as dedicated disk drive controllers are sufficiently sophisticated to apply equation, (1) and (3)–(5) above to calculate the values of TCAL as the angular position of the disk varies with each sector in the dedicated calibration track. Look-up tables may be stored in the random access memory 97 associated with the microprocessor 95 to obtain the values of the trigonometric functions in equations (4) and (5). In the preferred embodiment, however, a swifter calculation of track position correction signals is obtained by converting the sine and cosine function of equation (1) to a single trigonometric function so that:

$$TCAL = D + M_3 \cos(APC - \phi) \quad (6)$$

where $$M_3 = M_1/\sin \emptyset = M_2/\cos \emptyset \quad (7)$$

and $$\phi = \arctan(M_1 M_2) \quad (8)$$

Using the above expression for track position the correction signal TCAL it is only necessary to store the values of DC, $M_3$ and $\phi$ for each read/write head of the hard disk. The error correction signal can then be calculated by accessing a look-up table storing the values of the single cosine function of equation (6).

In the preferred embodiment the microprocessor 95 computes the values of the track position correction parameters DC, $M_3$ and $\phi$ for each read/write head of the hard disk. These values are then stored in the servo control chip 102. In operation, after the control parameters are calculated by the microprocessor 95 and stored in the control chip 102, the disk drive system resumes normal reading and writing of data from the hard disk. During this normal operation of the disk drive system, the servo control chip 102 will offset a dedicated servo head reading the dedicated track position servo pattern encoded on the dedicated servo surface so as to result in the accurate placement of the data read/write head 18 over the desired data track. The correction signals are calculated in the servo control chip 102 by application of equation (6) above. A cosine look-up table is stored in internal ROM within the control chip 102 and the value for the angular orientation of the disk (APC) is obtained by the index reference circuit 146 within the gate array chip 92.

Figure 8:
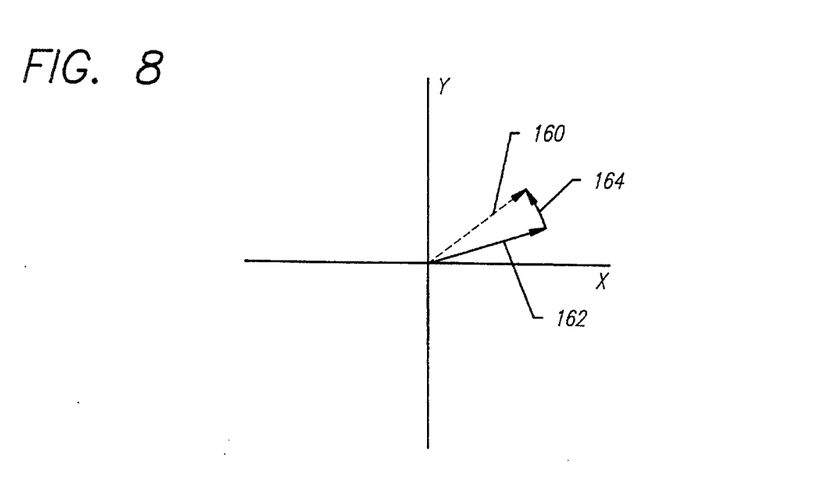
FIG. 8 is a graphic representation of the manner in which successive track position correction signals are applied in a preferred embodiment of the present invention.

Discrepancies in the stored position of the data track on the hard disk in the actual position of the track vary with time. Accordingly, the correction parameters are periodically recalculated by the microprocessor 95. In the preferred embodiment, the values of the correction parameters are DC $M_3$ and $\phi$ recalculated approximately every few minutes after the disk drive initially started from a shut down condition. As the drive continues to operate, the period between recalculation of the correction parameters is preferably lengthened. During the recalculation process, the read/write head is again positioned over the dedicated calibration track and the A minus B difference values x(i) are stored for each sector i in the dedicated calibration track. In the preferred embodiment, the read/write head is repositioned over the dedicated calibration track by the servo control chip 102 with the use of error correction signals calculated on the basis of the previously stored correction parameters. The new values for the correction parameters recalculated by the disk drive micro processor 95 are then added to the values previously stored in the servo control chip 102. As shown diagrammatically in FIG. 8, the resulting track correction signal 160 obtained after a first and second calculation of the correction parameters can then be represented as the vector sum of the first correction signal 162 and the second correction signal 164. This approach has been found to have the effect of reducing any errors inherent in the track position correction process and effects a "null seeking" approach to the correction values.

Thus a novel method and apparatus for optimally positioning a hard disk read/write head over a data track on the disk has been disclosed. Of course, it should be understood that the method and apparatus disclosed herein are merely illustrative of the principals of the present invention and could be implemented by other types of structures performing in the same or similar functions as the structures described herein. As mentioned above, for example, either the disk drive microprocessor 95 or servo control chip 102 could be used to calculate an instantaneous track position correction signal without departing from the spirit of the present invention. Similarly this correction signal could be calculated by using either of the trigonometric function (1) and (6) above. Other approximation equations of the curve illustrated in FIG. 7 could also be employed without departing from the spirit of the present invention. Additionally, the optimum number of A and B pulses within a sector cell, and the offset distance between the center line of the dedicated calibration track and the center line of the individual cells and pulse pattern, could easily be varied without effecting the utility of the track position correction method of the present invention. Accordingly, the scope of the present invention should not be limited to the embodiments shown in the drawings and specifically described above.

What is claimed is:

1. A magnetic memory apparatus, comprising:

a data read/write head;

a hard disk having an arcuate calibration track, the calibration track defining a calibration track centerline and including a plurality of sets of calibration indicia spaced along calibration track, each set defining a set centerline and including a plurality of first indicia spaced along the calibration track and a plurality of second indicia spaced along the calibration track, the first and second indicia extending from the set centerline in opposite radial directions, the set centerlines of sets adjacent to one another along the calibration track being radially offset from the calibration track centerline by different distances, thereby providing a digital indication of departure of the read/write head from the calibration track centerline when the read/write head is directed to follow the calibration track centerline;

means for sensing the indicia and calculating a read/write head position correction function; and means for positioning the read/write head in accordance with the correction function.

2. A magnetic memory apparatus as claimed in claim 1, wherein the sets of calibration indicia are progressively offset from the calibration track centerline.

3. A magnetic memory apparatus as claimed in claim 1, further comprising:

means for cumulatively updating the correction function in accordance with subsequent sensing of the calibration indicia.

4. A magnetic memory apparatus as claimed in claim 1, wherein the means for sensing the indicia and calculating a read/write head position correction function comprises means for calculating correction parameters that are independent of the angular orientation of the read/write head.

5. A magnetic memory apparatus as claimed in claim 4, further comprising means for storing the independent correction parameters and for repeatedly calculating the position correction signal on receipt of a signal indicative of the angular orientation of the hard disk.

6. A system for calibrating a data read/write head for a disk data storage system, comprising:

a rotatable disk for storing digital data, said disk including a plurality of circular data storage tracks;

means for rotating said disk;

a circular calibration track provided on said disk, said calibration track being separate and entirely radially offset from said data storage tracks and having a centerline;

a plurality of circumferentially spaced sets of calibration indicia formed on said calibration track, said sets each including a plurality of circumferentially spaced first indicia and a plurality of circumferentially spaced second indicia extending from centerlines of said sets respectively in opposite radial directions;

said centerlines of circumferentially adjacent sets being radially offset from said centerline of said calibration track by different distances respectively to provide a digital indication of departure of said read/write head from said centerline of said calibration track when said read/write head is directed to follow said centerline of said calibration track;

means for sensing said calibration indicia and calculating a read/write head position correction function in accordance therewith; and means for subsequently positioning said read/write head in accordance with said correction function.

7. The calibrating system of claim 6, wherein said system further comprises means for distinguishing between signals originating from said read/write heads when said calibration indicia are sensed by said read/write head and when other indicia encoded on said disk are sensed by said read/write head.

8. A system as in claim 6, in which said centerlines of said sets are progressively offset from said centerline of said calibration track by a maximum distance in one of said radial directions through a maximum distance in an opposite one of said radial directions.

9. A system as in claim 6, further comprising means for cumulatively updating said correction function in accordance with subsequent sensing of said calibration indicia.

10. A system as in claim 6, in which said first indicia are circumferentially offset from said second indicia.

11. A system for providing data track positional correction signals for a data read/write head in a disk memory storage device, comprising:

at least one data disk for magnetically storing data, said disk having a plurality of circular data storage tracks and a circular calibration track with a centerline, said calibration track being concentric with said plurality of data storage tracks;

a plurality of circumferentially spaced sets of magnetic calibration indicia that are formed on said calibration track, said sets each including a plurality of circumferentially spaced first indicia and a plurality of circumferentially spaced second indicia that extend from centerlines of said sets respectively in opposite radial directions;

said centerlines of circumferentially adjacent sets being radially offset from said centerline of said calibration track by different distances respectively to provide a digital indication of departure of said read/write head from said centerline of said calibration track when said read/write head is directed to follow said centerline of said calibration track;

said different distances being whole number multiples of a minimal incremental displacement of said read/write head with respect to the hard disk; and means for computing a positional correction signal based on differences in numbers of said first and second indicia sensed by said read/write head when centered over said calibration track for positional measurement, such that said positional correction signal is derived as a function of the angular orientation of said hard disk and said differences in said number of said first and second indicia.

12. The system of claim 11 wherein said position correction computing means includes means for calculating correction parameters that are independent of the angular orientation of the read/write head.

13. The system of claim 12 further comprising means for storing said independent correction parameters and for repeatedly calculating said position correction signal on receipt of a signal indicative of the angular orientation of the hard disk.

14. The system of claim 12 wherein the means for storing said correction parameters and for calculating said positional signal further includes means for generating control signals for positioning said read/write head with respect to a desired track on said hard disk.

15. The system of claim 11 further comprising means for receiving signals from said read/write head and distinguishing between signals originating from said first indicia and signals originating from said second indicia based on the angular position of said hard disk.

16. The system of claim 15 wherein said means for receiving and distinguishing signals originating from said first and second indicia further includes a first counter for storing the number of times signals originating from said first indicia are received by said receiving and distinguishing means and a second counter for storing the number of times signals originating from said second indicia are received by said receiving and distinguishing means.

17. The system of claim 16 wherein said receiving and distinguishing means further includes:

first gating means for sending a signal to said first counter only on receipt of a signal from said read/write head coincident with receipt of a first gating signal;

second gating means for sending a signal to said second counter only on receipt of a signal from said read/write head coincident with receipt of a second gating signal; and gating signal generating means, coupled to said first and second gating means, for generating said first and second gating signals as a function of the angular orientation of the hard disk.

* * * * *